April 22, 1958     W. S. ELLIS     2,831,705
IMPLEMENT HITCH WITH AUTOMATIC TRACKING MEANS
Filed July 5, 1956
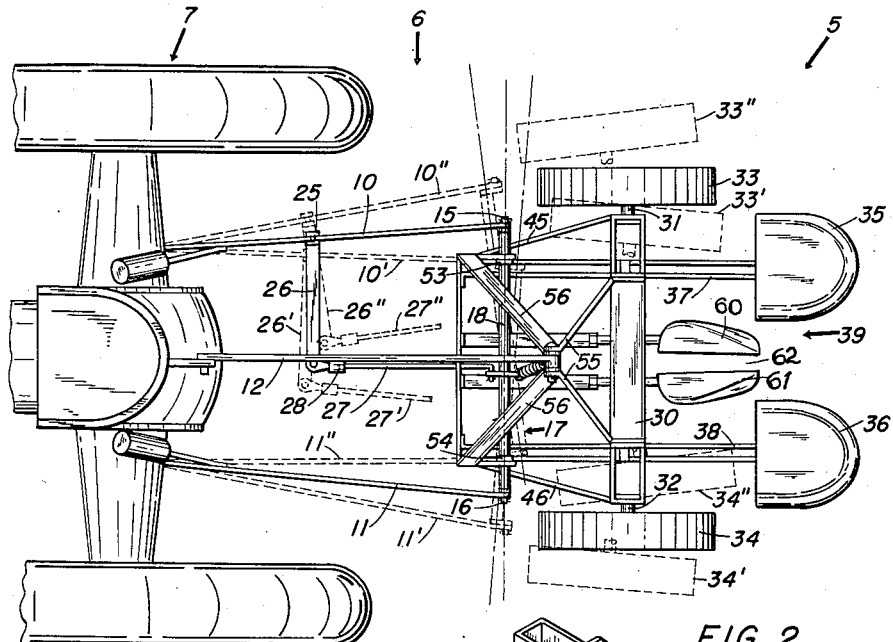
INVENTOR.
WAYNE S. ELLIS
BY
*John L. Diehl*
attorney

United States Patent Office 2,831,705
Patented Apr. 22, 1958

2,831,705

IMPLEMENT HITCH WITH AUTOMATIC TRACKING MEANS

Wayne S. Ellis, Madison, Wis., assignor to D. R. Ellis Mfg. Company, Verona, Wis.

Application July 5, 1956, Serial No. 595,887

3 Claims. (Cl. 280—446)

This invention relates to an implement hitch and more particularly to a hitch for connecting to the rear of a tractor, especially an agricultural tractor, a ground working or other implement such as a plow, cultivator, planter or the like.

It is often necessary to operate a tractor and a farm implement carried thereby on a "side hill"; that is, on the side of a hill while traveling across the direction of the slope. When operating a tractor and implement on a side hill it is generally necessary to compensate, in steering the tractor, for the tendency of the tractor to slide sideways down the hill and it is often desirable, when possible, to attempt to steer in order to compensate for the tendency of the implement to slide down the hill. When an implement is connected to the tractor by a pin and clevis or other hingeable attachment to the drawbar of the tractor this can generally be accomplished with reasonable facility with most implements, even with implements such as planters and transplanters, for example, cornplanters and transplanters such as those used for planting tobacco and cabbage plants and pine seedlings.

However, many agricultural tractors are now provided with draft or hitching means generally referred to as "three-point hitches" which generally comprise two draft links and a lifting link, all projecting rearwardly from the rear of the tractor, each link being pivotably attached at its forward end to the tractor and pivotably attached at its other end to the implement. Generally these links are provided with hydraulic or other means for raising or lowering them in order to raise or lower the implement.

When a tractor is operated on a side hill with an implement attached thereto by a three-point hitch, the operator may generally adjust his steering to correct for the tendency of the tractor to slide sideways down the hill with considerable ease, but finds it nearly impossible to correct properly for the tendency of the implement to slide sideways downhill and therefore to pull at an angle to the tractor; therefore the operator is not able to plant or transplant in straight rows.

Particularly with planters and transplanters it is extremely desirable to plant straight lines and transplanters in particular often have to operate on quite steep side hills. It is desirable at the same time that an implement and particularly a planter or transplanter be pulled or travel in such a manner that its frame remains at a substantially constant distance above the surface of the ground so that seeds are planted at a substantialy constant depth rather than that the implement be so hitched that the height of its frame above the ground is controlled by the angle of pitch of the tractor when traveling over uneven ground.

Drag links, as illustrated for example in Patent 1,916,-945, are adapted to cause an implement to trail or track a tractor when on level ground in a manner superior to that obtained with an ordinary single pin connection, but as has been pointed out they allow the implement to drift to one side when it is operated on a side hill.

Heretofore hitches have been proposed which provide for adjustment by the operator to change the relationship between the implement and the hitch; manual operation of a lever, valve or other controlling means is necessary to create each change of such relationship. These hitches do not cause the implement to trail the tractor in the manner of the hitch of my invention on uneven ground. Both on level ground and on side hills of uneven and varying slope such hitches provide only a rigid fixed relationship between tractor and implement which may be changed only by manual operation or adjustment by the operator, or provide a substantially entirely rigid such relationship.

It is therefore an object of this invention to provide a hitch which causes an implement to travel substantially directly behind a tractor and in line with the tractor when operated on side hills.

A further object is to provide a hitch for connecting an implement to a tractor which causes the implement to "track" or "trail" the tractor while being connected to the tractor by means of drag links and a lift link, in the manner in which an implement attached to the tractor by means of a pin and clevis would trail the tractor.

A further object of the invention is a hitch for attaching an implement to a tractor provided with a three-point hitch comprising drag links and a lift link which will cause the implement to trail the tractor or to travel in a substantially straight line behind it when implement and tractor are subjected to an externally imposed sidewise force such as the force of gravity during operation on a side hill and which at the same time causes or permits the implement to travel at a substantially constant distance above the surface of the ground.

Further objects of the invention will become apparent from the drawings and the following detailed description in which it is my intention to illustrate the applicability of the invention without thereby limiting its scope to less than that of all those equivalents which will be apparent to one skilled in the art.

In the drawings like reference numerals refer to like parts and:

Figure 1 is a diagrammatic view of a portion of a tractor and an implement provided with a hitch of my invention;

Figure 2 is a perspective view of the hitch of the invention and an implement, the implement being somewhat simplified;

Figure 3 is an elevation of the hitch of the invention and an implement, the implement being somewhat simplified; and Figure 4 is a perspective view of a portion of the hitch.

Referring now to the figures, there is shown an implement indicated generally as 5, connected by means of a hitch, indicated generally as 6, to a tractor indicated generally as 7.

The tractor is provided with drag links 10 and 11 of conventional form, hingeably attached to tractor 7 at their forward ends, and with lift link 12 also hingeably attached to the tractor at its forward end. The rear ends of drag links 10 and 11 are hingedly connected to the implement by means of pins 15 and 16 extending through holes therein. Pins 15 and 16 constitute off-set ends of the bar indicated generally as 17 and bar 17 may comprise straight center bar portion 18 having offset or crank arm portions 19 and 20 extending from the ends thereof substantially in opposite directions from each other. Attached to the outer ends of said crank arm portions 19 and 20 are pins 15 and 16, each having its axis parallel to bar 18 in the manner of crank pins. Near the center of bar 18 there may be welded or otherwise attached an upwardly extending member 21 with a hole at its extremity and a downwardly extending member 22 with a hole at its extremity. By any suitable means, such as clamp 25, transverse member 26 is rigidly secured and attached to one of the draft links such as draft link 10. Member 22 extending downwardly from bar 17 is hingeably attached at its lower end by link 27 to the end of bar 26. Suitable means may be provided as at 28 for adjusting the length of link 27.

Implement 5 may be a transplanter comprising a main frame member indicated as 30 having axles 31 and 32 attached thereto and wheels 33 and 34 supported on said axles. Seats 35 and 36 may be attached to frame 30 by means of supporting brackets 37 and 38 and the frame may also have attached thereto a planting assembly indicated generally as 39 and comprising planting shoes 60 and 61 provided with slot 62 thereinbetween through which plants may be inserted by operators sitting on seats 35 and 36. Members 43 and 44 may extend forwardly from frame 30 and supporting members 45 and 46 may extend downwardly and backwardly from the forward ends thereof to support planting assembly 39. Plates 43 and 44 are respectively provided with vertical slots 41 and 42 therein. Transverse bar 17 extends through slots 41 and 42 and may be prevented from lateral movement with respect thereto by collars 53 and 54 which may be welded or otherwise securely attached to bar 17. There may be provided members 55 attached to frame 30 at their lower ends and hingedly attached to the rearward end of lift link 12 at their upper ends. Members 56 may be attached to plates 43 and 44 and may extend upwardly therefrom and may be hingedly connected to the upper ends of members 55 and to the rearward end of lift link 12. Tension spring 58 is disposed with its lower end engaged hingeably in the hole in the upper end of member 21 and its upper end engaged hingedly with the ends of members 56, 55 and 12; such hingeable engagement may be provided merely by hooking each end of said spring into a hole or over a pin as shown.

The mode of operation of the invention is as follows: when tractor 7 and implement 5 are operated on a side hill sloping downwardly to the left of the tractor, the force of gravity causes the implement to tend to assume a position wherein the wheels are disposed as indicated by dotted lines 33′ and 34′ and drag links 10 and 11 have the position illustrated by dotted lines 10′ and 11′. At the same time, bar 26 is caused to tend to assume the position illustrated by dotted line 26′. Link 27 is thereby pulled forwardly and off-set bar 17 is so rotated that pin 16 tends to be disposed aft of its normal position and pin 15 tends to be disposed forward of its normal position. The pins only tend to be forced in this direction and since the position of the pins is positively controlled by their attachment to the ends of drag links 10 and 11, the actual result is that the right end of bar 17, i. e., the end adjacent collar 53, is forced backwardly and the left end, i. e., the end adjacent collar 54, is forced forwardly by the action of the respective ends of the off-set bar 17 on plates 43 and 44 so the main frame 30 is twisted from its normal position and wheel 34′ is caused to assume a position forward of its normal position while wheel 33′ is caused to assume a position aft of its normal position. Thus the implement is twisted or steered in such manner that its wheels engage the ground in tracks that are more at an angle to the axis of the tractor than the angle in which they would normally engage the ground. The implement is thereby caused by virtue of the engagement of the wheels with the ground to steer itself back into tracking relationship with the tractor. The effect of the invention is to move the effective draft point or the effective point of draft substantially backward and the invention functions only when the wheels are engaged with the ground.

If the tractor and implement are operated on a side hill sloping downward to the right, the wheels tend to assume the positions illustrated by dotted lines 33″ and 34″. Bar 26 is forced backwardly into the position indicated by lines 26″ and by an action opposite to that heretofore described, the implement is caused to steer itself uphill and back into tracking relationship with the tractor.

Spring 58 exerts a slight restoring force to aid the implement in steering itself back into tracking relationship with the tractor. It also provides a stabilizing force to cause the implement to track better on relatively level ground.

The freedom of vertical movement of bar 17 within slots 41 and 42 causes the implement to maintain a substantially constant relationship vertically with the ground i. e., frame 30 is caused to be supported from the ground by wheels 33 and 34 and thus the relationship between planting assembly 39 and the ground is caused to be determined by the wheels 33 and 34 traveling adjacent thereto rather than by tractor wheels traveling far forward thereof as is the case with three-point hitches heretofore proposed.

It is not necessary for the invention to be limited to a three-point hitch; it is applicable to all hitches in which the implement is attached to a tractor by two draft arms.

In summary, when a tractor connected to an implement with a three-point hitch is on a side-hill the implement drifts over to one side because the two bottom draft arms, if parallel, cause the front of the implement to remain parallel to the rear of the tractor; the path of the implement remains parallel to the path of the tractor but off-set therefrom by a certain amount. If the two lower draft arms are so arranged as to be further apart at their rear ends than at their front ends an imaginary point of draft near the front of the tractor is created so that the implement, as it drifts to one side, tracks at an angle to the track of the tractor as if it were provided with a long tongue hitched to a drawbar near the front wheels of the tractor.

Utilizing the hitch of the invention when the implement drifts to one side, for example, as a result of operating on a side hill, the off-set bar is freely twisted in direct proportion to the amount of drift and the front end of the implement remains parallel to the off-set bar rather than parallel to the rear end of the tractor; thus, the line of draft of the implement is shifted so that it is at a greater angle to that of the tractor than is the case with a normal three-point hitch. Because the tractor is traveling forward along a straight line established by its own axis and the implement is being dragged behind with its wheels engaged in the ground at a greater than usual angle with the tractor's line of travel, the wheels cause the implement to travel more quickly and readily back into line behind the tractor than is normally the case.

The invention depends entirely on the wheels of the implement digging into the ground to bring it back into line with the tractor and if the wheels are not in engagement with the ground the invention is not effective.

The manner in which the implement falls back in line behind the tractor is identical with that in which a two-wheeled trailer falls back in line behind a towing vehicle if for any reason it is laterally shifted. The importance of the invention results from the fact that with a three-point hitch this rather simple and very important advantage of a single point hitch is entirely lost if the draft arms are parallel and is partially lost if they are arranged in the ordinary manner so that a draft point is established far forward on the tractor.

For clarity and simplicity the illustration of means such as hydraulic cylinders or mechanically operated crank arms which are provided on tractors to raise draft arms 10 and 11 and lifting arm 12 have been included only in Figures 1 and 3.

Suitable modifications may be made in the preferred embodiments of my invention herein described and illustrated without departing from the invention.

Having thus disclosed my invention, I claim:

1. The combination of a wheeled implement and a hitch for attaching said implement to a tractor comprising two members disposed apart on said implement, each of said members being provided with a vertical slot therein, a transverse bar extending through said slots, said bar being freely rotatable and vertically moveable therein but provided with means adapted to restrict transverse movement of said bar with respect to said slots, said bar further comprising a crank arm at each end thereof extending respectively upward and downward and at least one member extending substantially vertically from said bar near the center thereof, a pair of draft links pivotably connected to said crank arms and extending forwardly therefrom and pivotably attachable to a tractor at their forward ends, a transverse member rigidly attached to one of said draft links, a link member pivotably connected and linking said transverse member at a point approximately midway between said draft links to the member extending substantially vertically from said transverse bar on the same vertical side as the crank arm having connected thereto the draft link to which said transverse member is connected, and a spring acting in tension between said implement and a member extending from said transverse bar, to bias said crank arms into substantially vertical positions.

2. The combination of a wheel-supported implement and a hitch for attaching said implement to a tractor comprising two transversely spaced vertically slotted plates attached to said implement, a transverse bar extending through said slots, said bar being freely rotatable and vertically moveable therein and provided with collars restricting its transverse movement, said bar further comprising an upwardly extending crank arm at one end thereof and a downwardly extending crank arm at the other end thereof, and a member extending substantially vertically from said bar near the center thereof, a pair of draft links pivotably connected to said crank arms and extending forwardly therefrom, the forward ends of said links being spaced apart and pivotably connectable to a tractor, a transverse member rigidly attached to one of said draft links and extending the other of said draft links, a link member pivotably connected at one end to said transverse member at a point approximately midway between said draft links and pivotably connected at its other end to said member extending substantially vertically from said transverse bar on the same vertical side of said bar as the crank arm having connected thereto the draft link to which said transverse member is connected, and a tension spring attached at one end to a member extending from said transverse bar and at the other end to said implement, for biasing said transverse bar to cause said crank arms to be disposed substantially vertically.

3. The combination of a wheel-supported implement and a hitch for attaching said implement to a tractor comprising two plates, each having a vertical slot therein and attached to said implement at transversely spaced apart points, a substantially straight cylindrical transverse bar extending through said slots, said bar being freely rotatable and vertically moveable within said slots but provided with collars restraining transverse movement of said bar with respect to said slotted members, said bar further comprising an upwardly extending crank arm at one end thereof and a downwardly extending crank arm at the other end thereof and a member extending substantially vertically downward from said bar near the center thereof, each of said crank arms provided with a crank pin extending laterally therefrom, a pair of draft links connected respectively at their rear ends to said crank arms by pivotably connecting with said pins, said draft links extending forwardly therefrom and pivotably connectable at their forward ends to spaced apart connecting means on the rear of a tractor, a transverse member rigidly attached at one end to the draft link connected to said downwardly extending crank arm, the other end of said transverse member being disposed substantially midway between said draft links, a link member pivotably connected to said other end of said transverse member and to said member extending downward from said bar, a member extending laterally from said transverse bar and spring attaching means on said implement and a tension spring connecting said member to said means and biasing said transverse bar to cause said crank arms to be disposed subtantially vertically.

References Cited in the file of this patent
UNITED STATES PATENTS

| | | |
|---|---|---|
| 2,379,225 | Fraga | June 26, 1945 |
| 2,653,531 | Collins | Sept. 29, 1953 |
| 2,653,824 | Frevik | Sept. 29, 1953 |
| 2,729,469 | Wilson | Jan. 3, 1956 |
| 2,731,897 | Frevik | Jan. 24, 1956 |

FOREIGN PATENTS

| | | |
|---|---|---|
| 549,780 | Great Britain | Dec. 7, 1942 |